United States Patent
Tsuji

(10) Patent No.: US 9,990,733 B2
(45) Date of Patent: Jun. 5, 2018

(54) OBJECT TRACKING DEVICE AND A CONTROL METHOD FOR OBJECT TRACKING DEVICE

(71) Applicant: CANON KABUSHIKI KAISHA, Tokyo (JP)

(72) Inventor: Ryosuke Tsuji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 15/146,373

(22) Filed: May 4, 2016

(65) Prior Publication Data

US 2016/0335780 A1    Nov. 17, 2016

(30) Foreign Application Priority Data

May 12, 2015 (JP) .................. 2015-097444

(51) Int. Cl.
*G06T 7/50* (2017.01)
*G06T 7/20* (2017.01)
*G06T 7/246* (2017.01)

(52) U.S. Cl.
CPC .............. *G06T 7/204* (2013.01); *G06T 7/248* (2017.01); *G06T 7/50* (2017.01); *G06T 2207/10016* (2013.01); *G06T 2207/10024* (2013.01)

(58) Field of Classification Search
CPC .. G06T 2207/10016; G06T 7/248; G06T 7/50
See application file for complete search history.

(56) References Cited

U.S. PATENT DOCUMENTS 7,573,505 B2   8/2009 Kawaguchi et al.
8,903,233 B1*  12/2014 Huang .................. G03B 13/36
                                              396/104

(Continued)

FOREIGN PATENT DOCUMENTS

JP   2001-060269 A   3/2001
JP   2002-251380 A   9/2002

(Continued)

*Primary Examiner* — Siamak Harandi
(74) *Attorney, Agent, or Firm* — Carter, DeLuca, Farrell & Schmidt, LLP

(57) ABSTRACT

In an object tracking device that obtains image data, detects an object, and tracks a target object, a matching unit collates image data of a characteristic model that represents a tracking object, which is a tracking target, with input image data, and outputs a candidate region of the tracking object. An object region determination unit determines an object region from the candidate region that is output by the matching unit. A depth map calculation unit calculates depth information relating to the input image. An object depth setting unit obtains the object region that has been determined by the object region determination unit in the past and the depth information that has been calculated by the depth map calculation unit, and sets a predetermined depth range where the object can exist. The object region determination unit determines an object region relating to the tracking object based on a region corresponding to the depth in a predetermined range set by the object depth setting unit and the candidate region that is extracted by the matching unit.

8 Claims, 9 Drawing Sheets

(56) References Cited

U.S. PATENT DOCUMENTS

| | | | |
|---|---|---|---|
| 2009/0322935 A1* | 12/2009 | Yamasaki | G02B 7/36 348/349 |
| 2014/0176663 A1* | 6/2014 | Cutler | H04N 7/142 348/14.07 |
| 2015/0145762 A1* | 5/2015 | Shimura | G06F 3/017 345/156 |

FOREIGN PATENT DOCUMENTS

| | | |
|---|---|---|
| JP | 2005-318554 A | 11/2005 |
| JP | 2008-015754 A | 1/2008 |

\* cited by examiner

OBJECT TRACKING DEVICE AND A CONTROL METHOD FOR OBJECT TRACKING DEVICE

BACKGROUND OF THE INVENTION

Field of the Invention

The present invention relates to an image processing technique that optically tracks an object.

Description of the Related Art

A technique that extracts a specific object image from images supplied in time series and tracks the object is utilized for specifying a human face region and a human body region in moving images. The object tracking technique can be used in many fields, for example, teleconferencing, man-machine interfaces, security, monitoring systems for tracking any object, image compression, and the like.

In digital still cameras and digital video cameras, there has been proposed a technique that extracts and tracks an object image in a captured image that is specified by an operation using a touch panel and the like, and consequently optimizes a focus state and an exposure state for the object. Japanese Patent Application Laid-Open Publication No. 2005-318554 discloses an image capturing apparatus that detects (extracts) and tracks the position of a face region included in a captured image, focuses on the face, and captures the image with optimal exposure. Japanese Patent Application Laid-Open Publication No. 2001-60269 discloses a technique that automatically tracks a specific object by using template matching. In the template matching processing, a partial image obtained by cutting out an image region including a specific object image (hereinafter, also referred to as a "tracking target") is registered as a template image. With the use of an input interface such as a touch panel, any region included in the image is specified, and the template image is registered as serving the region serving as a reference. A specific object can be tracked by calculating an area that is the highest in similarity or an area that is the lowest in dissimilarity in the image by comparison with the template image.

In the template matching processing, the similarity of pixel patterns is used as an evaluation scale. Accordingly, if the pixel patterns in the partial region in the tracking target and the objects other than the tracking target (for example, a background) are similar to each other, an object that should not be tracked may be tracked. As another tracking method, there is a method in which color histogram similarity is utilized as the evaluation scale for matching. In this case, if the proportions of the color in the partial region between the tracking target and the objects other than the tracking target are similar to each other, an object that should not be tracked may be tracked. In order to improve an accuracy of the object tracking, new information for distinguishing the tracking target from the objects other than the tracking target is necessary.

SUMMARY OF THE INVENTION

The present invention improves the accuracy of object tracking by using distance information (depth information) relating to an object as tracking information.

A device according to the present invention is an object tracking device that obtains image data, detects an object, and tracks an object to be targeted comprising: a matching unit that is configured to collate image data of a tracking object that is a tracking target with image data that has been obtained, and output information about a candidate region of the tracking object; a region determination unit that is configured to determine an object region relating to the tracking object from the candidate region that is output by the matching unit; a depth information calculation unit that is configured to calculate depth information for the object; and a depth range setting unit that is configured to obtain information about the object region that has been determined by the region determination unit at a previous time earlier than the current time and the depth information that has been calculated by the depth information calculation unit, and set a depth range on the basis of a depth of the tracking object, wherein the region determination unit determines an object region relating to the tracking object based on an image region falling within the depth range set by the depth range setting unit and a candidate region that is output by the matching unit.

Further features of the present invention will become apparent from the following description of exemplary embodiments with reference to the attached drawings.

DESCRIPTION OF THE EMBODIMENTS

Hereinafter, a description will be given of each preferred embodiment of the present invention with reference to the accompanying drawings. An optical apparatus according to the present invention is applicable to various types of lens apparatuses and imaging apparatuses, binoculars, and the like. As preferred embodiments of the present invention, although the following embodiments show an example of application to imaging apparatuses, for example, digital still cameras and video cameras, they are not intended to limit the technical scope of the present invention.

(First Embodiment)

Figure 1:
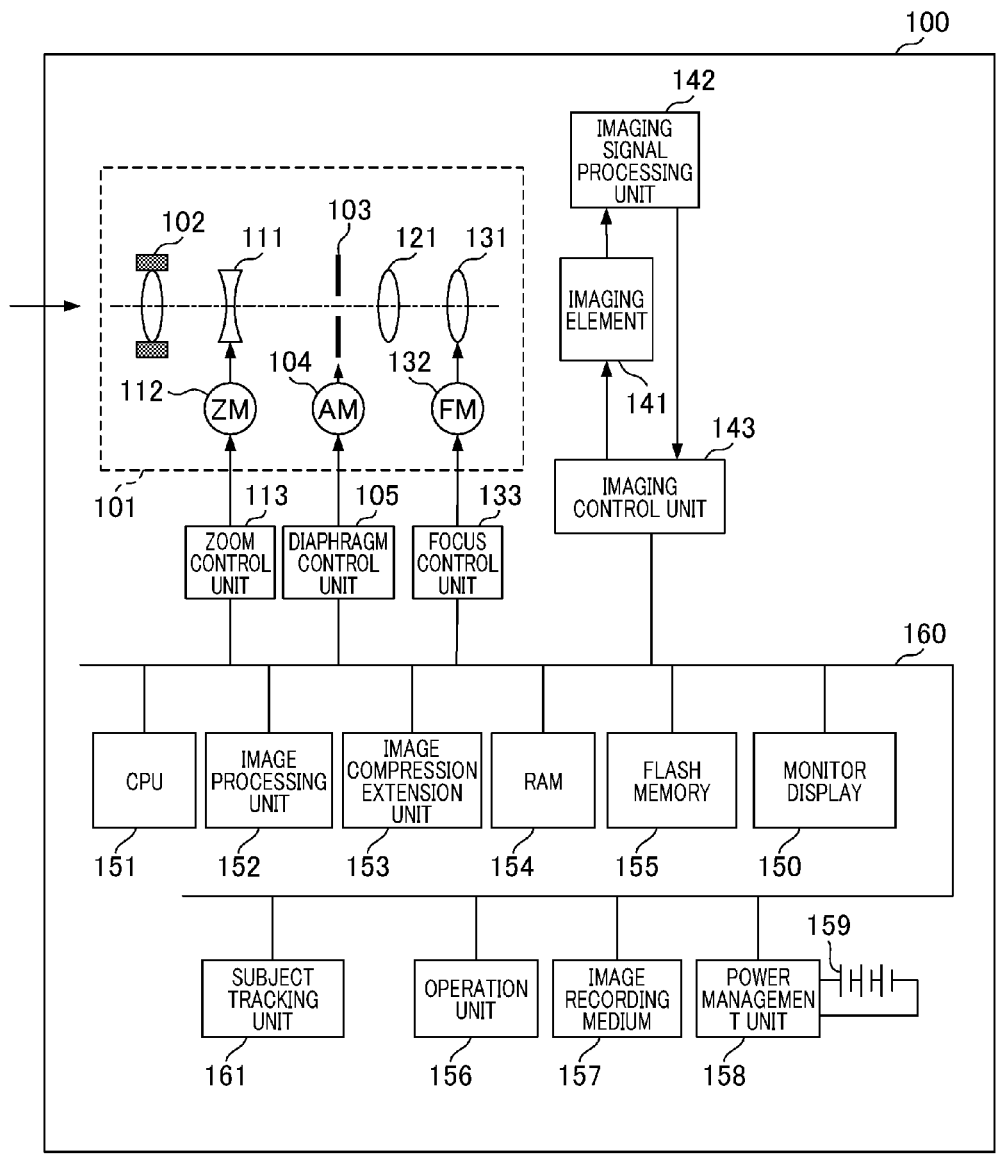
FIG. 1 is a block diagram illustrating a configuration example of an imaging apparatus according to an embodiment of the present invention.

With reference to FIG. 1, a description will be given of a configuration of an imaging apparatus according to a first embodiment of the present invention. FIG. 1 is a block diagram illustrating a configuration example of an image capturing apparatus 100. The image capturing apparatus 100 performs processing that captures an object and records data of moving images and still images on a recording medium. The data can be recorded on various media, as recording mediums, including a tape-like recording medium, a solid memory, an optical disk, a magnetic disk, and the like. Each unit in the image capturing apparatus 100 is connected via a bus 160 and is controlled by a CPU (Central Processing Unit) 151.

An image shooting lens (lens unit) 101 includes a fixed first group lens 102, a zoom lens 111, a diaphragm 103, a fixed third group lens 121, and a focus lens 131. A diaphragm control unit 105 drives the diaphragm 103 via a diaphragm motor 104 in accordance with a command of a CPU 151, adjusts an aperture diameter of the diaphragm 103, and performs the adjustment of a light amount during shooting. A zoom control unit 113 drives the zoom lens 111 via a zoom motor 112 and changes the focal distance. Additionally, a focus control unit 133 determines a drive amount of the focus motor 132 depending on a deviation amount of the focal position based on a focus detection signal of the image shooting lens 101, and performs drive control of the focus motor 132. The movement of the focus lens 131 is controlled by the focus control unit 133 and the focus motor 132, and thereby AF (automatic focus adjustment) control is realized. In FIG. 1, although the focus lens 131 is simply illustrated as a single lens, it is usually configured of a plurality of lenses.

Light from an object is forms an image on an imaging element 141 via each optical member that configures the image shooting lens 101. The object image formed on the imaging element 141 is converted into an electric signal by the imaging element 141. The imaging element 141 is a photoelectric conversion element that photoelectrically converts an object image (optical image) into an electric signal. The imaging element 141 is configured by a plurality of microlenses and a pixel unit that includes a plurality of photoelectric conversion elements corresponding to each microlens. That is, a parallax image can be generated by using the imaging element including the plurality of photoelectric conversion elements (first photoelectric conversion element and the second photoelectric conversion element) that share one microlens. The image capturing apparatus 100 includes an object tracking device that tracks a specific object, and performs calculation by using distance information (depth information) calculated based on the parallax image in the object tracking.

Figure 2:
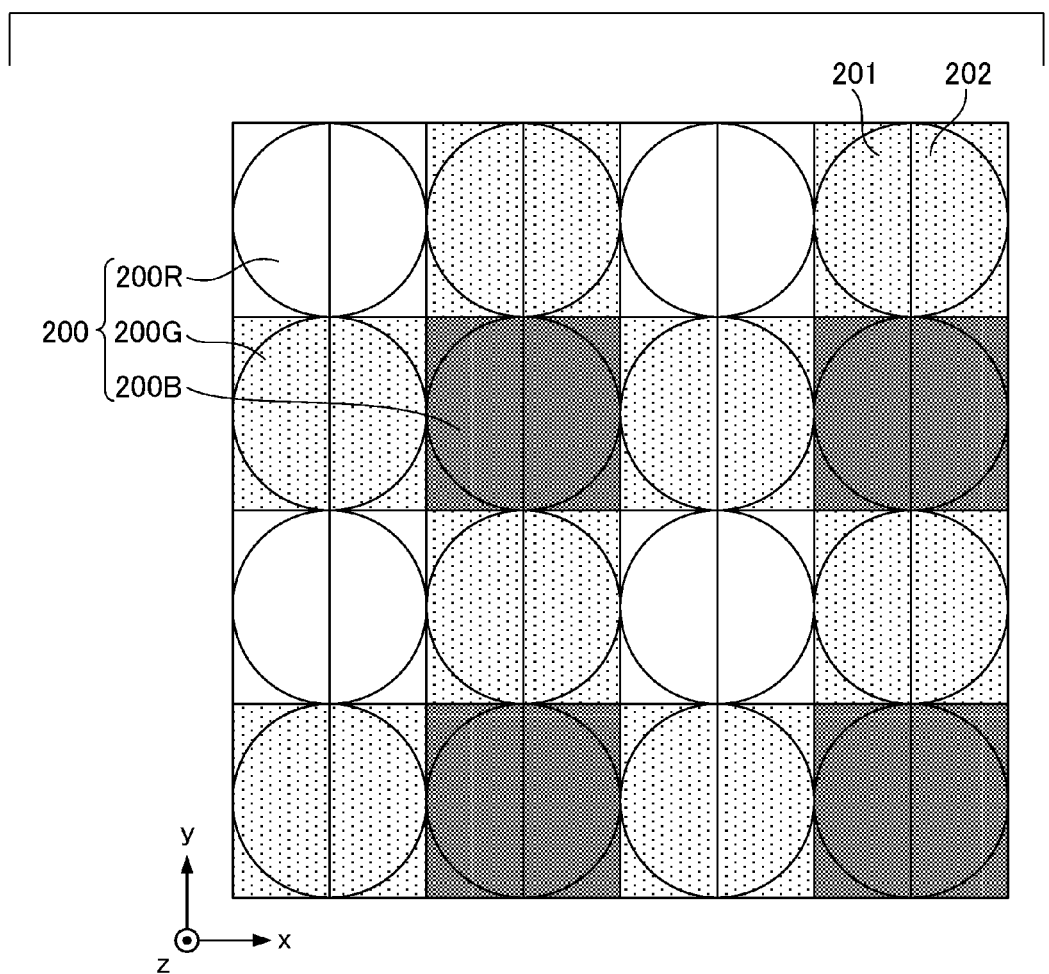
FIG. 2 is a schematic diagram illustrating a pixel arrangement in the embodiment of the present invention.

With reference to FIG. 2, a description will be given of an arrangement of imaging pixels and focus detection pixels of the imaging element 141 in the present embodiment. FIG. 2 illustrates an imaging pixel arrangement of a two-dimensional CMOS (Complementary Metal Oxide Semiconductor) sensor in the range of 4 columns×4 rows and illustrates a focus detection pixel arrangement thereof in the range of 8 columns×4 rows. A pixel group 200 of 2 columns×2 rows includes a pair of pixel 200R, 200G, and 200B shown below:

Pixel 200R (see the upper left position): pixels having spectral sensitivity to R (red)
Pixel 200G (see the upper right and lower left positions): pixels having spectral sensitivity to G (green)
Pixel 200B (see the lower right position): pixels having spectral sensitivity to B (blue)

Each pixel unit is configured of a first focus detection pixel 201 and a second focus detection pixel 202, which are arranged in 2 columns×1 row. A large number of pixels of 4 columns×4 rows (focus detection pixels of 8 columns×4 rows) shown in FIG. 2 is arranged in a grid shape on a plane, and consequently, the captured image signals and focus detection signals can be obtained.

Figure 3A:
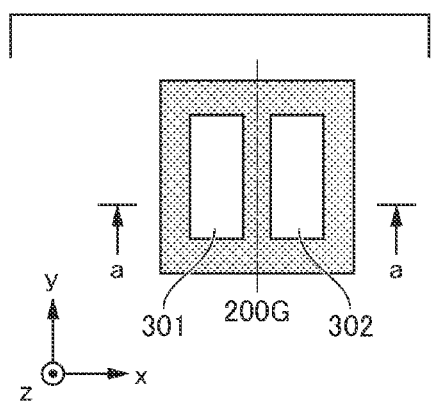
FIG. 3A is a schematic plan diagram illustrating pixels in the embodiment of the present invention.

A plan diagram in which one pixel 200G in the imaging element shown in FIG. 2 is viewed from the light receiving surface side of the imaging element (+z side) is shown in FIG. 3A. The z-axis is set in a direction perpendicular to the drawing of FIG. 3A, and the front side is defined as the positive direction of the z-axis. Additionally, the y-axis is set in the vertical direction orthogonal to the z-axis and the upper side is defined as the positive direction of the y-axis, and the x-axis is set in the horizontal direction orthogonal to the z-axis and the right side is defined as the positive direction of the x-axis. Along a-a cut line in FIG. 3A, a cross-sectional diagram when viewed from the −y direction is shown in FIG. 3B.

Figure 3B:
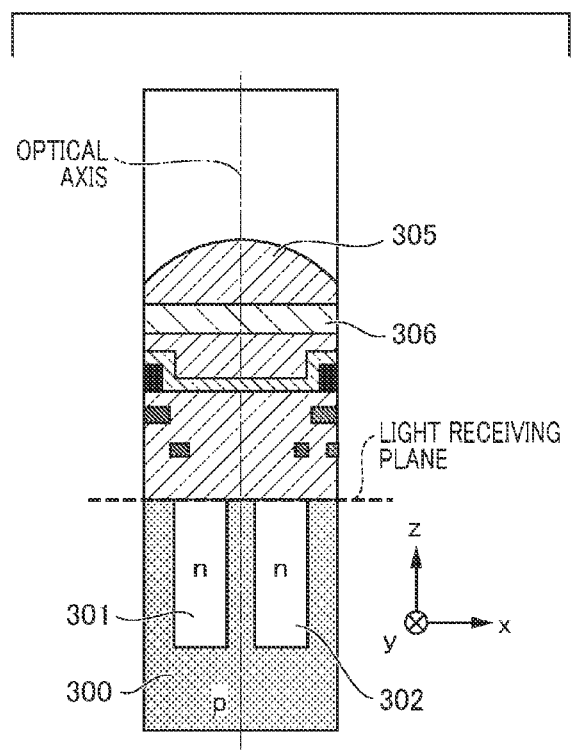
FIG. 3B is a schematic cross-sectional diagram illustrating the pixels in the embodiment of the present invention.

In the pixel 200G shown in FIG. 3B, a microlens 305 that collects incident light on the light receiving surface side (+z-direction) of each pixel is formed, and a plurality of photoelectric conversion units that have been divided is included. For example, the divided number in the x-direction is defined as $N_H$, and that in the y-direction is defined as $N_V$. In FIG. 3, an example in which the pupil region is divided in two in the x-direction, that is, the case of $N_H$=2 and $N_V$=1 is illustrated, and a photoelectric conversion unit 301 and a photoelectric conversion unit 302, which serve as the sub-pixels, are formed. The photoelectric conversion unit 301 corresponds to the first focus detection pixel 201, and the photoelectric conversion unit 302 corresponds to the second focus detection pixel 202. The photoelectric conversion unit 301 and the photoelectric conversion unit 302 are formed as, for example, a pin structure photodiode in which an intrinsic layer is interposed between a p-type layer 300 and an n-type layer. Alternatively, as necessary, it may be possible to form them as a pn junction photodiode, with the intrinsic layer omitted. In each pixel, a color filter 306 is formed between the microlens 305, and the photoelectric conversion unit 301 and the photoelectric conversion unit 302. As necessary, it may be possible to change spectral transmittance of the color filter 306 for each sub-pixel and possible to omit the color filter.

The light incident to the pixel 200G are collected by the microlens 305, and additionally, after being spectrally dispersed by the color filter 306, they are received by the photoelectric conversion unit 301 and the photoelectric conversion unit 302. In the photoelectric conversion unit 301 and the photoelectric conversion unit 302, electrons and holes (positive holes) are pair-produced depending on the received light amount, and after they are separated in a depletion layer, electrons having negative charge are accumulated in an n-type layer (not illustrated). In contrast, the holes are discharged to the outside of the imaging element through a p-type layer connected to a constant voltage source (not illustrated). The electrons accumulated in the n-type layer (not illustrated) of the photoelectric conversion unit 301 and the photoelectric conversion unit 302 are transferred to a capacitance unit (FD) via a transfer gate, and are converted into voltage signals.

Figure 4:
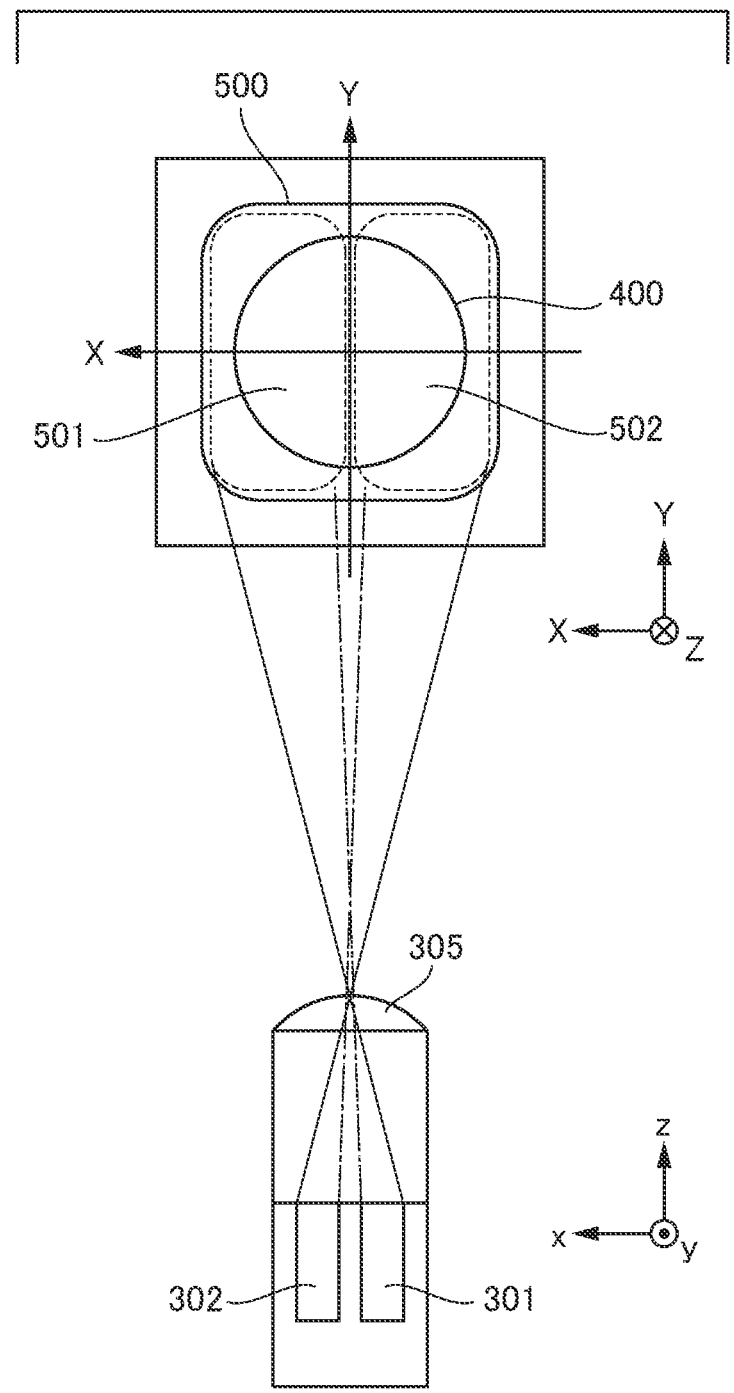
FIG. 4 is a schematic diagram illustrating a relation between the pixels and a pupil division in the embodiment of the present invention.

FIG. 4 is a schematic explanatory diagram illustrating the correspondence relation between a pixel structure and the pupil division. FIG. 4 illustrates a cross-sectional diagram that illustrates a cut surface along a line a-a of the pixel structure shown in FIG. 3A, viewed from the +y-direction, and illustrates an exit pupil plane of an imaging optical system (see an exit pupil 400), viewed from the −z direction. In the cross-sectional diagram of FIG. 4, the x-axis and y-axis are illustrated by inverting the state shown in FIG. 3A, in order to correspond with coordinate axes on the exit pupil plane. A first pupil partial region 501 corresponding to the first focus detection pixel 201 is almost in a neighboring relation by the microlens 305 with respect to a light receiving surface of the photoelectric conversion unit 301, of which the center of mass deviates in the −x direction. That is, the first pupil partial region 501 represents a pupil region that enables receiving light in the first focus detection pixel 201, and the center of mass deviates in the +x direction on the pupil plane. Additionally, a second pupil partial region 502 corresponding to the second focus detection pixel 202 is almost in a neighboring relation by the microlens 305 with respect to a light receiving surface of the photoelectric conversion unit 302 of which the center of mass deviates in the +x direction. The second pupil partial region 502 represents a pupil region that enables receiving light in the second focus detection pixel 202, and on the pupil plane, the center of mass is displaced in the −x direction.

Figure 5:
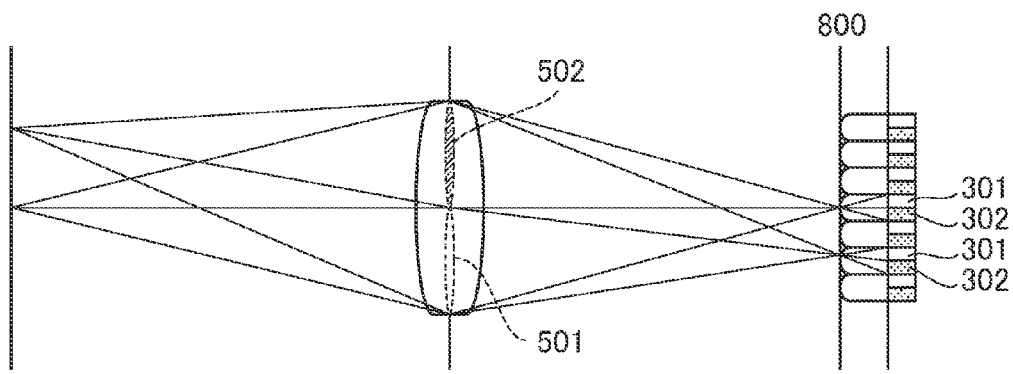
FIG. 5 is a schematic explanatory diagram of an imaging element and the pupil division in the embodiment of the present invention.

A pupil region 500 shown in FIG. 4 is a pupil region in which light can be received in the entire pixel 200G in a case where the photoelectric conversion unit 301 and the photoelectric conversion portion 302 (the first focus detection pixel 201 and the second focus detection pixel 202) are both combined. The correspondence relation between the imaging element and the pupil division is shown in the schematic diagram of FIG. 5. Light fluxes that have passed through different pupil partial regions, the first pupil partial region 201 and the second pupil partial region 502, are incident to each pixel of the image element at different angles. Light incident to an imaging surface 800 is received by the first focus detection pixel 201 and the second focus detection pixel 202, which are divided into $N_H$ (=2)×$N_V$ (=1). The photoelectric conversion unit 301 of the first focus detection pixel 201 and the photoelectric conversion unit 302 of the second focus detection pixel 202 convert lights into the electrical signals. In the present embodiment, an example in which the pupil region is pupil-divided into two in a horizontal direction is described. If necessary, pupil division may be performed in a perpendicular direction.

The imaging element 141 according to the present embodiment includes a first focus detection pixel that receives a light flux passing through the first pupil partial region of the imaging optical system, and a second focus detection pixel that receives a light flux passing through the second pupil partial region of the imaging optical system, which is different from the first pupil partial region. A plurality of the imaging pixels that receive a light flux passing through the pupil region obtained by combining the first pupil portion region and the second pupil partial region of the imaging optical system is arranged in a two-dimensional array state. That is, each imaging pixel is composed of the first focus detection pixel and the second focus detection pixel. If necessary, a configuration may be adopted in which the imaging pixel, the first focus detection pixel, and the second focus detection pixel serve as a separate pixel configuration, and the first focus detection pixel and the second focus detection pixel are partially distributed in the imaging pixel arrangement.

In the present embodiment, "A-image", which is the first focus detection signal, is generated by collecting light receiving signals of the first focus detection pixel 201 in each pixel, and "B-image", which is the second focus detection signal, is generated by collecting light receiving signals of the second focus detection pixel 202 in each pixel in the imaging element 141. An object tracking unit 161 described below calculates an image deviation amount based on the A-image and B-image having parallax, and the processing that calculates the distance information (depth information) from the image deviation amount is performed. Additionally, for each pixel of the imaging element 141, the A-image and the B-image are add to generate an "A+B image", and image data used for display or recording can be generated. The image signal that has been generated by focusing (an image) on the imaging element 141 and performing photoelectric conversion is output to an imaging signal processing unit 142 in FIG. 1. The imaging signal processing unit 142 processes the image signal that is input, and performs shaping processing to the image data.

The imaging signal processing unit 142 outputs the image data that has been processed to an imaging control unit 143. The image data that has been processed is temporarily stored and accumulated in a RAM (random access memory) 154. After an image compression extension unit 153 performs the compression processing on the image data accumulated in the RAM 154, it performs a process that records the data on an image recording medium 157. In parallel with this, the image data accumulated in the RAM 154 is transmitted to an image processing unit 152. The image processing unit 152 processes the image data, for example, the processing that reduces or enlarges the data to an optimal size. The image data that has been processed to the optimal size is transmitted to a monitor display 150 and the image is displayed. An operator can observe the shot images in real time while viewing the image displayed on the monitor display 150. Note that, immediately after the shooting, the operator can check the shot image by displaying it on the monitor display 150 for a predetermined period of time. An operation unit 156 includes various operation switches, and is used when the operator performs an instruction on the image capturing apparatus 100. The operation instruction signal input from the operation unit 156 is transmitted to the CPU 151 via the bus 160.

The CPU 151 determines setting values of various parameters based on the operation instruction signal input from the operation unit 156 or the size of the pixel signal of the image data that is temporary accumulated in the RAM 154. The various parameters are, for example, an accumulation time of the imaging element 141, and a gain setting value when an output from the imaging element 141 to the imaging signal processing unit 142 is performed. The imaging control unit 143 obtains a command signal about the accumulation time and the gain setting value from the CPU 151, and controls the imaging element 141 in accordance with the command signal.

The data of the A+B image, which is image data accumulated in the RAM 154, is also transmitted to the object tracking unit 161. The object tracking unit 161 tracks a specific object by using a plurality of image data having different image capture times. As a result for the tracking, a partial region (image region) that shows the specific object is extracted. Additionally, each data of the A-image and the B-image corresponding to the parallax image is also accumulated in the RAM 154. Each data of the A-image and the B-image is used as information for calculating distance information (depth information) based on the parallax image, and for tracking the specific object. The details will be described below.

The output of the object tracking unit 161 is reported to each processing unit via the bus 160. For example, the focus control unit 133 obtains the output of the object tracking unit 161 and performs AF control on the specific object region. Additionally, the diaphragm control unit 105 obtains the output of the object tracking unit 161 and performs exposure control using a luminance value on the specific object region. The image processing unit 152 obtains the output of the object tracking unit 161 and performs gamma correction, white balance processing, and the like, based on the specific object region. Additionally, the monitor display 150 displays an object region including a part of the object image, which is a tracking target, in distinction from other image regions by using a rectangular frame and the like, in accordance with the output of the object tracking unit 161.

A power management unit 158 manages a battery 159 and supplies a stable power to the entire image capturing apparatus 100. A flash memory 155 stores a control program necessary for the operation of the image capturing apparatus 100. When the operator performs a start operation of the image capturing apparatus 100, the power OFF state transits to the power ON state, and the control program stored in the flash memory 155 is loaded and read in a part of the RAM 154. The CPU 151 controls the operation of the image capturing apparatus 100 in accordance with the control program that has been loaded in the RAM 154.

Next, with reference to FIG. 6, a description will be given of the detail of the object tracking unit 161. The object tracking unit 161 detects an object to be tracked, and tracks a specific object by using image data supplied sequentially. As a result for the tracking, a partial region representing the specific object in the image is extracted. The object tracking unit 161 utilizes the image data of the A+B image in detection processing and the matching processing for tracking, and additionally, performs object tracking with high accuracy by using the distance information about the object. In order to calculate the distance information, the object tracking unit 161 utilizes the data of the A-image and the B-image.

Figure 6:
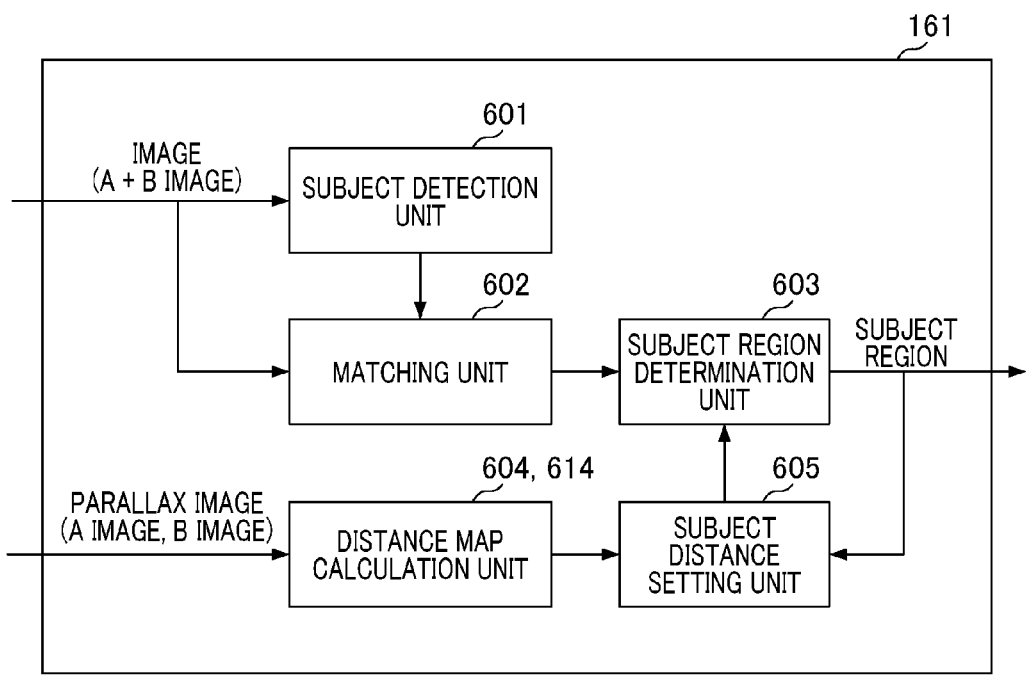
FIG. 6 is a block diagram illustrating a configuration example of an object tracking device according to the embodiment of the present invention.

FIG. 6 is a block diagram illustrating a configuration example of the object tracking unit 161. An object detection unit 601 detects a predetermined object image to be targeted from the A+B image, which is an input image, and serves the image as a tracking target in object tracking. For example, in case of face detection, the object tracking unit 161 specifies a human face region and the like as the object region. As face detection techniques, for example, there are a method in which knowledge regarding a face (skin color information, shape information such as eyes, nose and mouth) is utilized, and a method in which a discrimination processing unit for face detection is configured by learning algorithm typified by a neural network. Additionally, in face detection, in order to improve a recognition rate, face recognition is commonly performed by combining a plurality of methods.

Specifically, there is a method in which face detection is performed by utilizing a wavelet transform and a feature value of images (see Japanese Patent Application Laid-Open Publication No. 2002-251380) and the like. Alternatively, a configuration may be used in which, in a form in which the operation unit 156 includes an input interface unit including a touch panel and an operation button, the operator specifies any object image included in a captured image as a tracking target. In this case, the object detection unit 601 obtains positional information specified by the operation unit 156, and detects the object region based on the positional information.

A matching unit 602 in FIG. 6 obtains data of the A+B image, which is an input image, and registers the object region that has been detected by the object detection unit 601 as a template. The matching unit 602 performs matching processing that collates the template that has been registered with the partial regions of the input image that are sequentially input, and outputs a plurality of higher evaluation values and region information as a candidate region of the tracking object. There are a number of matching methods, and in the present embodiment, a method by template matching based on the differences between pixel patterns is applied. With reference to FIG. 7, a description will be given of the detail of the template matching.

Figure 7A:
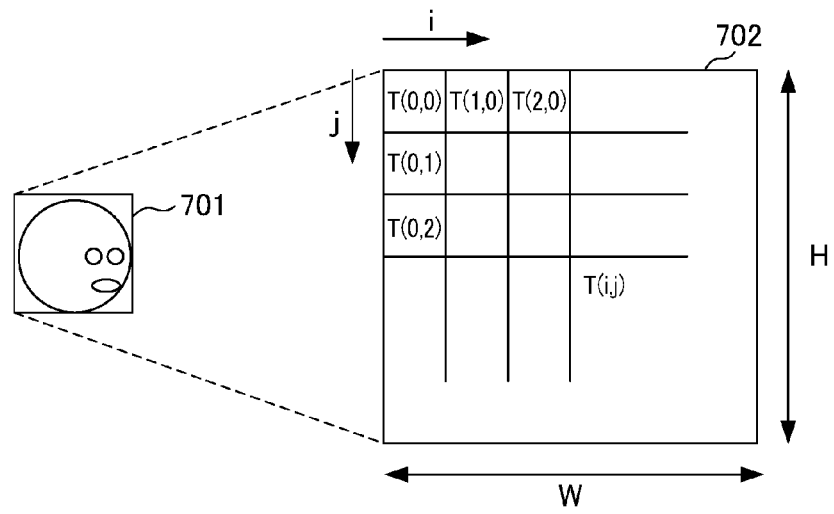
FIG. 7A and FIG. 7B illustrate template matching according to the embodiment of the present invention.

FIG. 7A illustrates an object model (template) in the template matching. An image 701 on the left represents an image in an object region that is a tracking target. A description will be given of an example in which the pixel pattern of the image 701 serves as the feature value. Data arrangement 702 represents a feature value of the image 701, and a two-dimensional arrangement in a case where a luminance signal of the pixel data serves as a feature value is illustrated. Two-dimensional coordinates (i, j) are set in the template region, wherein the variable "I" represents position coordinates in the horizontal direction, and the variable "j" represents position coordinates in the vertical direction. A feature value in the two-dimensional coordinates (i, j) is denoted by "T (i, j)", the number of horizontal pixels is denoted by "W", and the number of vertical pixels is denoted by "H". The feature value T (i, j) is represented by the following formula.

$$T(i,j)=\{T(0,0),T(1,0),\ldots,T(W-1,H-1)\} \qquad \text{[Formula 1]}$$

Figure 7B:
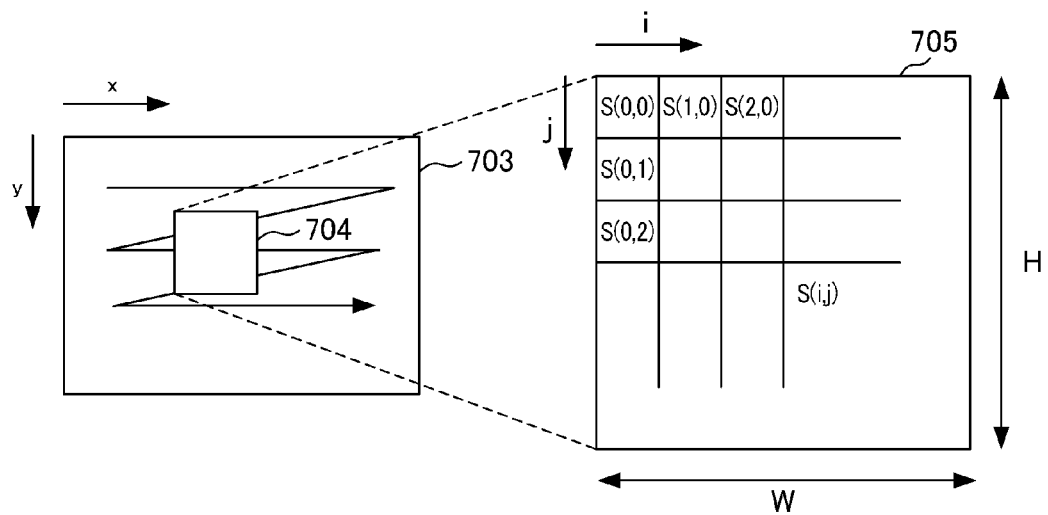

FIG. 7B illustrates a search image when searching a tracking target. An image 703 on the left shows an image in a range for performing the matching process. In the two-dimensional coordinates in the search image, the horizontal direction is defined as the x-direction, and the vertical direction is defined as the y-direction, which are represented by (x, y). A rectangular partial region 704 shown in the image 703 is a partial region for obtaining an evaluation value of the match. A feature value 705 of the partial region 704 is represented by a two-dimensional arrangement, and the luminance signal of the image data serves as the feature value similar to the case of template. The feature value in the two-dimensional coordinates (i, j) in the partial region 704 is denoted by S (i, j), the number of horizontal pixels is denoted by W, and the number of vertical pixels is denoted by H. The feature value S (i, j) is represented by the following formula.

$$S(i,j)=\{S(0,0),S(1,0),\ldots,S(W-1,H-1)\} \qquad \text{[Formula 2]}$$

In the present embodiment, as a calculation method for evaluating the similarity between the template region and the partial region, the sum of the absolute values of the difference, what is referred to as "SAD (Sum of Absolute Difference)" is used. When the SAD value is represented by V (x, y), this is calculated by the following formula.

$$V(x, y) = \sum_{j=0}^{H-1} \sum_{i=0}^{W-1} |T(i, j) - S(i, j)| \qquad \text{[Formula 3]}$$

While shifting the partial region 704 by each pixel in order from the upper left of the image 703 in the search region, the calculation of the SAD value V (x, y) is performed. If the SAD value V (x, y) obtained by the calculation is a minimum value, the coordinates (x, y) indicate a position that is most similar to the template. That is, the position where the SAD value shows a minimum value is a position having a high probability that the tracking target exists in the search image.

In the above description, although an example in which one type of information, which is a luminance signal, is used as the feature value is shown, it may be possible that two or more pieces of information about, for example, the signals of the brightness, hue, and saturation, or the signals combing them, are handled as the feature value. Additionally, as a calculation method for the matching evaluation value, although a description was given by using the SAD value as an example, a calculation method, for example, normalization cross-correlation, what is referred to as "NCC Normalized Correlation Coefficient)", and the like may also be used. Additionally, the present invention is not limited to only template machining to apply the present invention, and other matching methods, for example, histogram matching based on the similarity of the histogram may be adopted.

An object region determination unit 603 in FIG. 6 determines one object region from among the candidate regions of the object to be tracked, based on the plurality of higher evaluation values and the region information supplied from the matching unit 602. For example, a region having a highest evaluation value is determined to be the object region. This is a simple determination method, but if pixel patterns are similar between the tracking target and a partial region in a background or another object, an evaluation value of the object region not to be tracked may increase. Accordingly, in the present embodiment, by referring to the distance information (distance map data, depth distribution) calculated based on the parallax image data, the processing that determines a correct object region is performed. Thus, the probability of detecting an object region to be tracked can be increased. Information about the one object region that has been determined by the object region determination unit 603 is output from the object tracking unit 161.

A distance map calculation unit 604 obtains the data for a pair of images (A-image, B-image) having a parallax in the horizontal direction, and calculates the object distance. The object distance is information indicating a distance (depth) from the image capturing apparatus to the object. The image deviation amount can be detected by performing correlation calculation processing on a pair of images having parallax in the horizontal direction. In the detection processing of the image deviation amount, for example, correlation calculation is performed for each small block obtained by dividing the image region into small regions (see Japanese Patent Application Laid-Open Publication No. 2008-15754). By multiplying a predetermined conversion coefficient with respect to the image deviation amount calculated by the correlation calculation, a deviation (defocus amount) in the imaging plane of the image is calculated. Hereinafter, the defocus amount that has been calculated is referred to as "calculated distance". The information about the distance distribution in which the calculated distance is assigned to each pixel of the image on the imaging surface is referred to as a "distance map".

An object distance setting unit 605 obtains information about the object region that has been determined by the object region determination unit 603 at a past timing and the distance map data that has been calculated by the distance map calculation unit 604, and sets a distance in a predetermined range in which the object can exist. The object region determination unit 603 determines one region that corresponds to the distance in the predetermined range that is set by the object distance setting unit 605 and is a candidate region that has been extracted by the matching unit 602 as the object region. Specifically, a variable representing the passage of time is denoted by "n", and the image data at time n–1 and the image data at time n has been obtained. In this case, time n–1 and time n are continuous, and the object distance between the two times does not change significantly. The object distance setting unit 605 calculates the distance at which the object exists at time n–1, based on the partial region that has been determined by the object region determination unit 603 at time n–1 (object region) and the distance map at time n–1 in the partial region. The object distance setting unit 605 sets the distance range (depth range. hereinafter, referred to as a "setting distance range") on the basis of the calculated distance of the target object, and the partial region that corresponds to within the setting distance range is determined by the distance map at time n. The object region determination unit 603 extracts only the partial region corresponding to within the setting distance range, with respect to the plurality of higher evaluation values by the matching unit 602 at time n. Subsequently, the object region is determined from the partial region that has been extracted.

Figure 8:
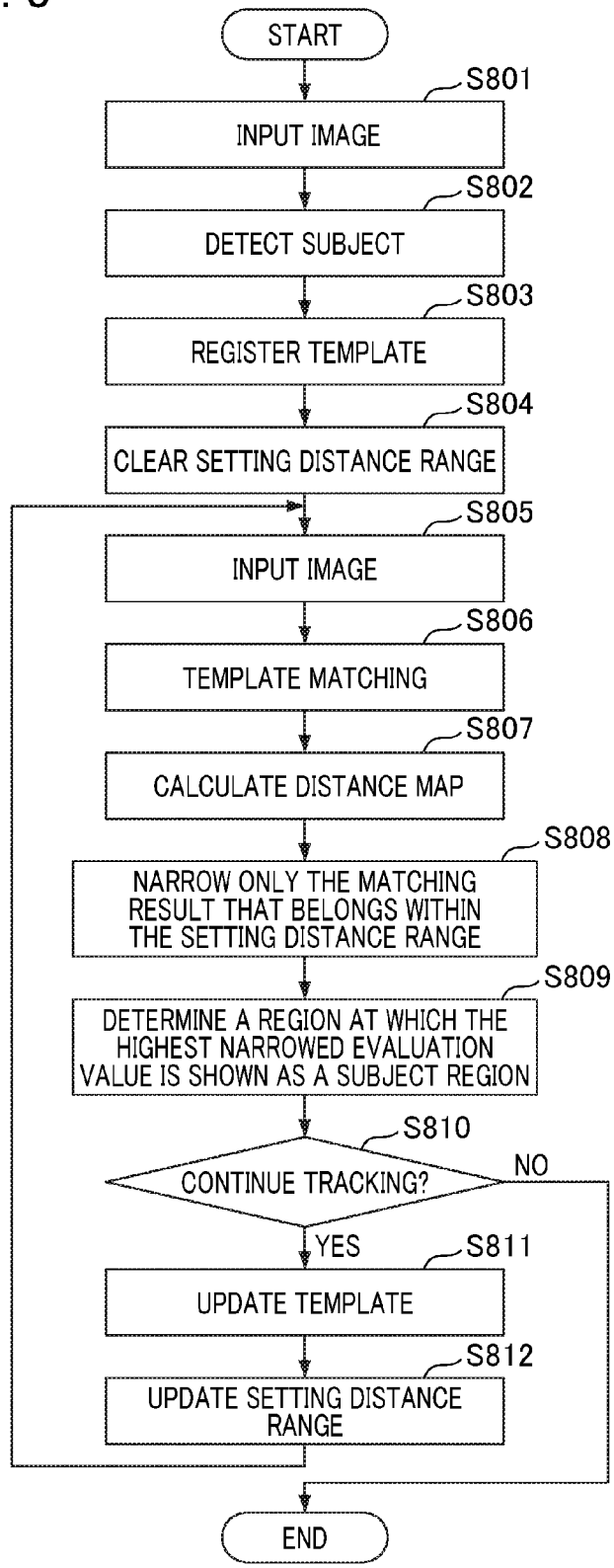
FIG. 8 is a flowchart illustrating object tracking processing according to the embodiment of the present invention.

Next, with reference to a flowchart in FIG. 8, a description will be given of the process performed by the object tracking unit 161. First, the captured image at time n–1 is supplied as an input image to the object tracking unit 161 (S801). The object detection unit 601 detects a specific object region from this image (S802). The matching unit 602 registers a template, which is an object model of the template matching, based on the specific object region that has been detected (S803). Additionally, at the initial timing of the tracking processing, the object distance setting unit 605 initializes and clears a value of the object distance (setting distance range, setting depth range) (S804). Note that S802, S803, and S804 are performed in a random order.

Next, the captured image at a time n that differs from the time in S801 is supplied as an input image (S805). The input image in S805 represents a search image by the object tracking unit 161. Based on this search image, the matching unit 602 performs collation by template matching (S806). Additionally, the distance map calculation unit 604 calculates the distance map based on the data of the input image in S805 (S807). Note that S806 and S807 are performed in random order.

In S808, the object region determination unit 603 narrows down the matching result in S806, based on the distance range that has been set in advance (the setting distance range before being updated in S812) and the distance map that has been calculated in S807. Regarding the initial process, however, because the setting distance range does not exist (because the range is cleared in S804), the matching result is never narrowed down. Next, the object region determination unit 603 determines a partial region in which the highest evaluation value is obtained as the result for the matching that has been narrowed down in the setting distance range, as an object region (S809). When one object region that belongs to the setting distance range is determined, the object tracking unit 161 determines whether or not it continues tracking based on the object region that has been determined (S810). As an example of the determination, in S808, the object tracking unit 161 determines no continuance of tracking if all regions are not matched as the result for matching.

If no continuance of the object tracking processing is determined ("NO" is determined in S810), the object tracking processing ends. For example, the process ends if the object image to be tracked no longer exists in the image within the search range. In contrast, if the continuance of the object tracking processing is determined ("YES" is determined in S810), the process proceeds to S811.

In S811, the object region determination unit 603 updates the template of the matching unit 602 based on the object region that has been determined. The object distance setting unit 605 updates the distance map and updates the setting distance range based on the object region that has been determined (S812). The details of the setting distance range will be described below. Next, the process returns to S805, and the object tracking unit 161 continues the object tracking processing based on the input images that are supplied sequentially.

In the above description, processing that narrows down the matching evaluation value based on the setting distance range was exemplified. The present invention is not limited thereby, and the object region may be determined by the two conditions, the matching evaluation value and the setting distance range (setting depth range). For example, the present embodiment may be implemented by a structure in which the region to be matched is restricted by using the setting distance range and the distance map thereby to avoid the output of the matching evaluation value in the setting distance range.

As described above, the object tracking device according to the present embodiment determines an object region from the region that corresponds to the distance in the predetermined range and from the candidate region that has been extracted by the matching unit 602. The distance (depth) in the predetermined range is set based on the result for the object tracking, which is past history information. Appropriately utilizing the condition of the distance in the predetermined range allows improving the accuracy of the object tracking. For example, if the setting distance range is too large, the restriction based on the distance information is reduced, and the effect of referring to the distance information is thereby reduced. Additionally, if the setting distance range is too small, the object moves significantly in the depth direction (direction along the shooting direction), and it may be out of the setting distance range. In this case, there is a concern that the region to be tracked is excluded from the candidate region. Accordingly, in the present embodiment, an optimum distance range is set in order to improve the accuracy of the object tracking.

With reference to FIG. 9, a description will be given of a process that sets a distance range depending on the condition of the object tracking. On the basis of the position shown in the image capturing apparatus 100 in FIG. 9, a three-dimensional space coordinate system consisting of the x-axis, the y-axis, and the z-axis is set. The x-y plane consisting of the x-axis and the y-axis is a plane parallel to the imaging surface of the captured image, and the z-axis is an axis along the optical axis direction in the imaging optical system orthogonal to the x-y plane. The distance (depth) is calculated on the basis of the position of the image capturing apparatus 100 in the z-axis direction. Among a plurality of objects 901 to 904, the object 901 represents a tracking target, and the objects 902 to 904 represent objects that are different from the tracking target. As shown in FIG. 9, the objects 902 and 903 are located closer to the image capturing apparatus 100 as compared with the tracking object 901, and the object 904 is located far from the imaging capturing apparatus 100 as compared with the tracking object 901. When performing the setting of the distance range, the object tracking device mounted on the image capturing apparatus 100 uses history information that has been obtained at a previous time earlier than the current time. The history information is, for example, distance information about the object region that has been obtained in a most recent predetermined period of time. FIG. 9 shows a manner in which setting distance ranges 905, 906, 907, and 913 in each tracking condition are set.

Figure 9A:
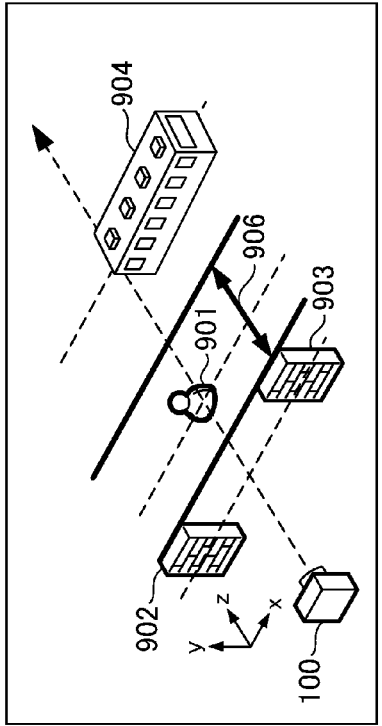
FIG. 9A to FIG. 9D illustrate a specific example of a setting distance range according to the embodiment of the present invention.
Figure 9B:
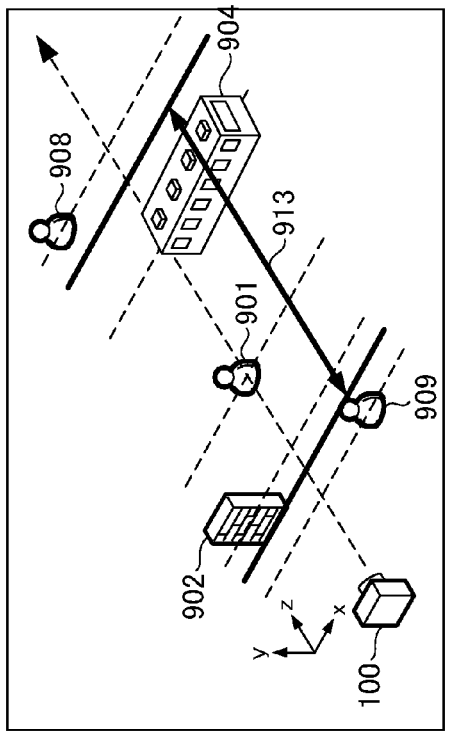

FIGS. 9A and 9B illustrate a case where the distance range is set based on a past movement of the tracking target. FIG. 9A shows a case in which the tracking target moves slowly. The setting distance range 905 is set in a range having a width in the front or back of the position of the tracking object 901 in the z-axis direction. FIG. 9B shows a case in which the target moves fast. The setting distance range 906 is set to a range having a width in the front or back of the position of the tracking object 901 in the z-axis direction, and it is larger than the setting distance range 905. That is, when comparing the setting distance ranges 905 and 906, the one in which the tracking target moves faster is larger in the setting distance range. In the case of the tracking target that moves fast, there is a probability that the tracking object will be excluded from the setting distance range, and therefore the setting distance range is made large. In contrast, in the case of the tracking target that moves slowly, the probability in which the tracked object is excluded from the setting distance range is low. Hence, the setting distance is made small in order to enhance the effect of referring to the distance information.

Figure 9C:
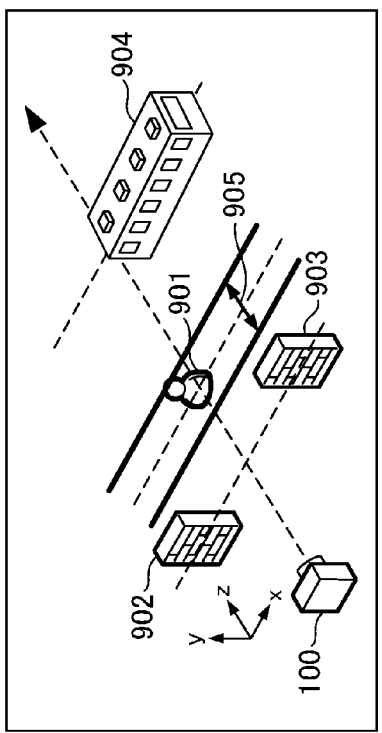
Figure 9D:
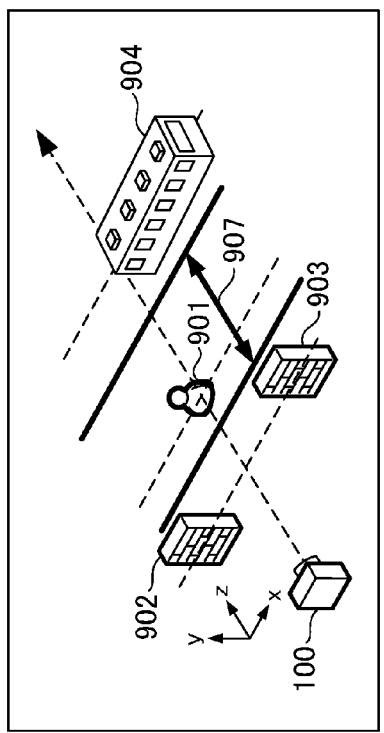

FIGS. 9C and 9D illustrate a case in which the distance range is set based on the distance relation (distance difference) between the tracking object and the object that is different from the tracking object. In FIG. 9C, the distance range is set based on the distance information about a plurality of objects other than the tracking target. The plurality of objects are the objects 902 and 903, which are the nearest neighbor, located frontwards closer to the image capturing apparatus 100 with respect to the tracking object 901, and an object 904, which is the nearest neighbor, located backwards far from the image capturing apparatus 100. Setting of the distance range is performed based on the distance information about the objects 902 and 903 and that about the object 904. In the object tracking, the purpose of referring to the distance information is to distinguish the tracking target from another object. If the distance between the tracking target and another object is short (if the distance difference is small), the object tracking device reduces the setting distance range. On the contrary, if the distance between the tracking target and another object is long (if the distance difference is large), the object tracking device increases the setting distance range.

FIG. 9D illustrates a case in which the distance range is set based on the distance relation with the object that is similar to the target. The object that is similar to the tracking target indicates an object having characteristics similar to those of the tracking target. The objects 902 and 904 shown in FIG. 9D represent objects that are not similar to the object 901, which is a tracking target. Additionally, the objects 908 and 909 represent objects that are similar to the object 901, which is a tracking target. For determining the similarity, matching evaluation values are used. That is, the "object is similar" means that the matching evaluation values between the tracking target and anther object are close. When using the template matching method described in the present embodiment, a similar object indicates an object that is similar in pixel pattern to the image that has been obtained. Alternatively, when using the color histogram matching method, the similar object is an object that is similar to the percentage of color. If distinguishing between the tracking target and another object is difficult only by using the matching evaluation values, it is effective to refer to the distance information about the object because distinguishing the plurality of objects can be allowed. That is, it is possible to improve the accuracy of the object tracking with the use of the distance information by setting the distance range based on the distance relation (distance difference) between the tracking target and the objects similar to the tracking target. Consequently, the setting distance range can be set relatively large, and the object tracking device can respond to the fast-motion of the tracking target.

Additionally, the object tracking device distinguishes the motion of the object (the moving speed in the shooting direction) that is similar to the tracking target. For example, the object tracking device determines that an object similar to the tracking target is a moving object or a stationary object, and changes the setting of the distance range in accordance with the determined result. The distance range is set small if the object is a moving object, and the distance range is set large if the object is a stationary object. Alternatively, if the object similar to the tracking target is a moving object, the faster the object moves, the smaller the distance range is set in accordance with the moving speed. As described above, in the distance range setting processing performed by the object distance setting unit 605, the setting distance range is dynamically changed in accordance with the situation of the object tracking, and consequently in the object tracking processing, the distance information can be effectively utilized.

In the present embodiment, even in a case in which the pixel patterns are similar in each image between the objects, which is a tracking target, and another object, and the distinction is difficult only by the matching evaluation values, the target can be accurately tracked by using the distance information if distances to each object differ. That is, even if the tracking object and another object are similar in the pixel patterns and the color histogram, accurate object tracking is possible if they differ in distance. According to the present embodiment, in the optical tracking of the object, it is possible to improve the accuracy of tracking by utilizing distance information about the object.

(Second Embodiment)

Next, a description will be given of a second embodiment of the present invention. In the present embodiment, a countermeasure is taken against the lowering of a tracking accuracy when distance information is referred to in a case in which the distance information is not correct. A device according to the present embodiment further includes a calculation unit that calculates a reliability map that indicates the reliability of the distance map data, together with the distance map. Specifically, in FIG. 6, the distance map calculation unit 604 is replaced with a distance map and reliability map calculation unit 614. When the distance map and reliability map calculation unit 614 calculate the distance information by the distance information calculation processing, it executes the reliability calculation processing and calculate the reliability map relating to the distance information. For example, if the value of the reliability is small, the reliability of the corresponding distance map data is low.

Here, a description will now be described with respect to an example of generating processing of the reliability map. In the calculation processing of the distance map, a pair of image regions having a parallax in the horizontal direction is divided into small regions, correlation calculation is performed for each of the small blocks, and an image deviation amount is consequently detected. In a case in which the correlation calculation is based on the similarity of the image pattern, if the image pattern of the small block is an aggregate of pixels that are similar each other, the peak value of the correlation occurs with difficulty. Therefore, the detection of the correct image deviation amount is difficult. Accordingly, if the difference between the average value and the peak value (the maximum value in the case of similarity) in the calculation value obtained as the result for the correlation calculation is small, the reliability is determined to be low. That is, the reliability can be defined by utilizing the difference. This reliability has coordinate information so as to be calculated by each small block, and therefore a map (reliability map) representing the distribution of the reliability information about the distance information is generated.

The object region determination unit 603 in FIG. 6 determines an object region from a region that corresponds to the distance within the predetermined range set by the object distance setting unit 605 or a region where the reliability by the reliability map is higher than a threshold, and from a candidate region that has been extracted by the matching unit 602. In other words, if the reliability of the distance map data is smaller than the threshold, processing that performs avoidance so as not to narrow down the candidate region of the matching result is performed. According to the present embodiment, using the reliability information representing the reliability of the distance information makes it possible to increase the accuracy of the object tracking with the use of the correct distance information. Note that, in the first and second embodiments, although the distance map data is generated from the data obtained by the imaging element 141, the present invention is not limited thereby. For example, it may be possible to generate a distance map data map by guiding a part of light that has passed through the image shooting lens 101 to a range circuit provided separately from the imaging element 141 by using a half mirror, and obtaining distance information from the range circuit, which is a component different from the imaging element 141.

(Other Embodiments)

Embodiment (s) of the present invention can also be realized by a computer of a system or apparatus that reads out and executes computer executable instructions (eg, one or more programs) recorded on a storage medium (which may also be referred to more fully as a 'non-transitory computer-readable storage medium') to perform the functions of one or more of the above-described embodiment (s) and/or that includes one or more circuits (eg, application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (eg, central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-097444, filed May 12, 2015, which is hereby incorporated by reference wherein in its entirety.

What is claimed is:

1. An object tracking device that obtains image data, detects an object, and tracks a target object comprising:
   one or more processors; and
   a memory coupled to the one or more processors and including instructions stored thereon that, when executed by the one or more processors, cause the object tracking device to:
   collate image data of a tracking object, which is a tracking target, with image data that has been obtained, and output information about a candidate region of the tracking object;
   determine an object region relating to the tracking object from the candidate region that is output;
   calculate depth information of the object; and
   set a depth range based on information about the object region that has been determined and the depth information that has been calculated,
   wherein the object region relating to the tracking object is determined based on an image region falling within the depth range that is set and the candidate region that is output.

2. The object tracking device according to claim 1, wherein the depth information is calculated by obtaining data of a plurality of images having a parallax and calculating an image deviation amount of the plurality of images.

3. The object tracking device according to claim 1, wherein the instructions, when executed by the one or more processors, further cause the object tracking device to:
   calculate information about reliability representing the reliability of the depth information,
   wherein an object region relating to the tracking object is determined based on an image region having depth information in which the reliability that has been calculated is higher than a threshold and a candidate region that is output.

4. The object tracking device according to claim 1, wherein the depth range is set to be larger when a moving speed of the tracking object in a shooting direction is faster than a predetermined value rather than when the moving speed of the tracking object in a shooting direction is equal to or slower than the predetermined value.

5. The object tracking device according to claim 1, wherein information about a depth difference between the tracking object and an object that is different from the tracking object is obtained, the depth range is set to be larger when the depth difference is larger than a predetermined value rather than when the depth difference is equal to or smaller than the predetermined value.

6. The object tracking device according to claim 5, wherein, an object that has been determined to be similar to the tracking object as a result for performing the determination of similarity with the tracking object is determined as an object that is different from the tracking object, and information about the depth difference between the object that has been determined and the tracking object is obtained.

7. The object tracking device according to claim 5, wherein a moving speed of an object that is different from the tracking object is determined, the depth range is set to be larger when the object is determined to be a stationary object rather than the object is determined to be a moving object.

8. A control method executed by an object tracking device that obtains image data, detects an object, and tracks a target object, the control method comprising:
   collating image data of a tracking object, which is a tracking target, with image data that is input;
   outputting information about a candidate region of the tracking object;
   calculating depth information of an object;
   determining an object region relating to the tracking object from the candidate region that is output; and
   setting a depth range based on information about the object region that has been determined and the depth information that has been calculated,
   wherein the object region relating to the tracking object is determined based on an image region falling within the depth range that has been set and a candidate region that is output.

* * * * *